US012641534B2

(12) United States Patent
Wu et al.

(10) Patent No.: US 12,641,534 B2
(45) Date of Patent: May 26, 2026

(54) HARQ FEEDBACK TRANSMISSION FOR SIDELINK COMMUNICATION WITH MULTI-TRP ENABLED UEs

(71) Applicant: QUALCOMM Incorporated, San Diego, CA (US)

(72) Inventors: Shuanshuan Wu, San Diego, CA (US); Kapil Gulati, Belle Mead, NJ (US); Sourjya Dutta, San Diego, CA (US); Hui Guo, Beijing (CN); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 18/252,837

(22) PCT Filed: Jan. 22, 2021

(86) PCT No.: PCT/CN2021/073188

§ 371 (c)(1),
(2) Date: May 12, 2023

(87) PCT Pub. No.: WO2022/155870

PCT Pub. Date: Jul. 28, 2022

(65) Prior Publication Data

US 2024/0007945 A1 Jan. 4, 2024

(51) Int. Cl.
*H04W 48/20* (2009.01)
*H04W 92/18* (2009.01)

(52) U.S. Cl.
CPC ............ *H04W 48/20* (2013.01); *H04W 92/18* (2013.01)

(58) Field of Classification Search
CPC ..... H04W 48/20; H04W 92/18; H04W 24/10; H04W 76/23; H04W 88/02; H04W 76/14;
(Continued)

(56) References Cited

U.S. PATENT DOCUMENTS

2020/0229145 A1* 7/2020 Kang .................... H04W 72/02
2020/0374978 A1 11/2020 Panteleev et al.
(Continued)

FOREIGN PATENT DOCUMENTS

EP 3713318 A1 9/2020

OTHER PUBLICATIONS

Institute for Information Industry (III): "Power Control for Multi-TRP Uplink Transmission", 3GPP Draft, 3GPP TSG RAN WG1 Meeting #97, R1-1907372 Power Control for Multi-TRP Uplink Transmission, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728810, 5 pages, the whole document.
(Continued)

*Primary Examiner* — Andrew W Chriss

(74) *Attorney, Agent, or Firm* — Dinsmore & Shohl LLP

(57) ABSTRACT

Certain aspects of the present disclosure provide a method for wireless communications by a first user equipment (UE). The method generally includes receiving a first sidelink transmission from a second UE, determining resources for providing a feedback responsive to the first sidelink transmission, selecting one or multiple transmitter receiver points (TRPs), from a set of TRPs of the UE, for transmitting the feedback, based on one or more conditions, and transmitting the feedback on the determined resources using the selected TRPs.

23 Claims, 15 Drawing Sheets

(58) Field of Classification Search
CPC ....... H04W 72/02; H04W 72/25; H04W 4/40;
H04W 72/40; H04L 1/16; H04L 1/1812
See application file for complete search history.

(56)                    References Cited

U.S. PATENT DOCUMENTS

2022/0330038 A1 *  10/2022  Ganesan  ............... H04W 8/005
2024/0015722 A1 *   1/2024  Wang  ................. H04B 7/06954

OTHER PUBLICATIONS

International Search Report and Written Opinion—PCT/CN2021/073188—ISA/EPO—Jun. 30, 2021.
Qualcomm Incorporated: "HARQ-ACK Enhancement for IOT and URLLC", 3GPP Draft, 3GPP TSG RAN WG1 #102-e, R1-2006799, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051918249, pp. 1-15, pp. 1-3, section 1, section 2 .1. 2.

* cited by examiner

700

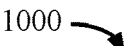

1000

┌─────────────────────────────────────────────────────────────┐  ⌐1002
│                                                             │
│   RECEIVE A FIRST SIDELINK TRANSMISSION FROM A SECOND UE    │
│                                                             │
└─────────────────────────────────────────────────────────────┘
                              │
                              ▼
┌─────────────────────────────────────────────────────────────┐  ⌐1004
│                                                             │
│   DETERMINE RESOURCES FOR PROVIDING A FEEDBACK RESPONSIVE    │
│            TO THE FIRST SIDELINK TRANSMISSION                │
│                                                             │
└─────────────────────────────────────────────────────────────┘
                              │
                              ▼
┌─────────────────────────────────────────────────────────────┐  ⌐1006
│   SELECT ONE OR MULTIPLE TRANSMITTER RECEIVER POINTS (TRPS), │
│     FROM A SET OF TRPS OF THE UE, FOR TRANSMITTING THE       │
│       FEEDBACK, BASED ON ONE OR MORE CONDITIONS             │
└─────────────────────────────────────────────────────────────┘
                              │
                              ▼
┌─────────────────────────────────────────────────────────────┐  ⌐1006
│                                                             │
│   TRANSMIT THE FEEDBACK ON THE DETERMINED RESOURCES USING    │
│                  THE SELECTED TRPS                           │
│                                                             │
└─────────────────────────────────────────────────────────────┘

FIG. 10

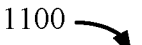

1100

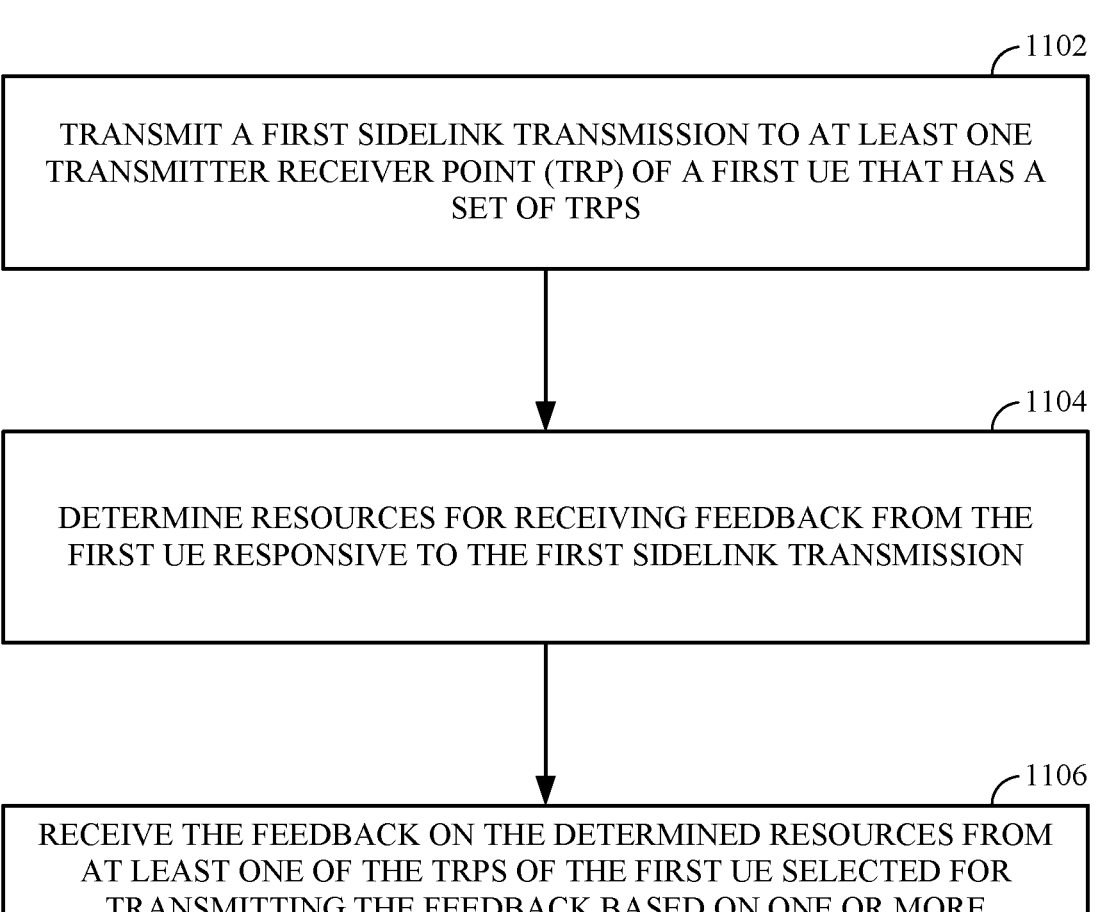

1102

TRANSMIT A FIRST SIDELINK TRANSMISSION TO AT LEAST ONE
TRANSMITTER RECEIVER POINT (TRP) OF A FIRST UE THAT HAS A
SET OF TRPS

1104

DETERMINE RESOURCES FOR RECEIVING FEEDBACK FROM THE
FIRST UE RESPONSIVE TO THE FIRST SIDELINK TRANSMISSION

1106

RECEIVE THE FEEDBACK ON THE DETERMINED RESOURCES FROM
AT LEAST ONE OF THE TRPS OF THE FIRST UE SELECTED FOR
TRANSMITTING THE FEEDBACK BASED ON ONE OR MORE
CONDITIONS

FIG. 11

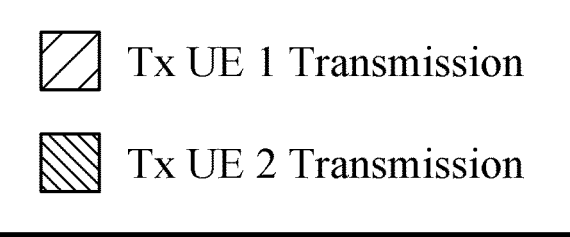
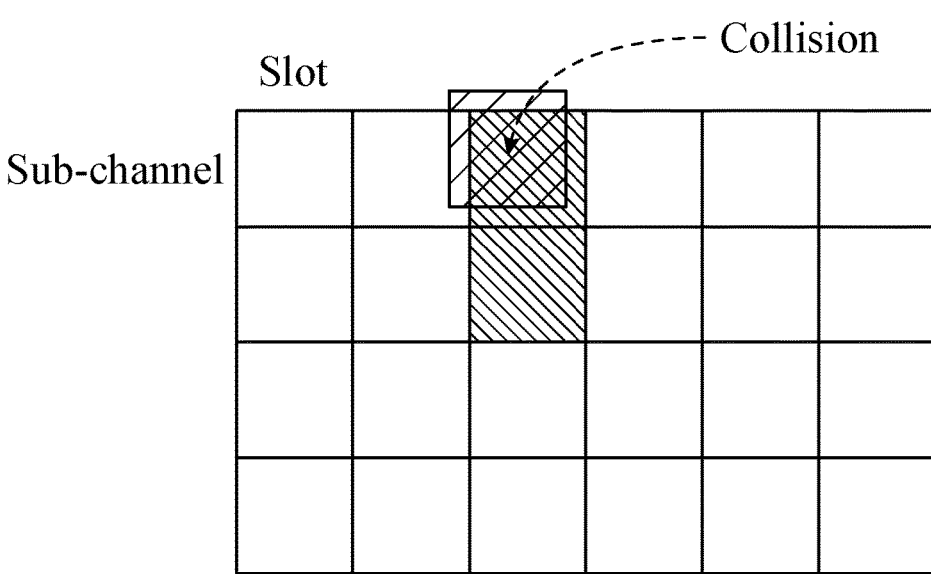
FIG. 12

1400

1402

Processing System

1404

Processor

1424

Circuitry for obtaining

1426

Circuitry for determining

1428

Circuitry for selecting

1429

Circuitry for outputting

1412

Computer-Readable Medium/Memory

1414

Code for obtaining

1416

Code for determining

1418

Code for selecting

1419

Code for outputting

1410

1408

Transceiver

1406

1500

1502

Processing System

1504

Processor

1524

Circuitry for outputting

1526

Circuitry for determining

1528

Circuitry for obtaining

1512

Computer-Readable
Medium/Memory

1514

Code for outputting

1516

Code for determining

1518

Code for obtaining

1510

1508

Transceiver

1506

HARQ FEEDBACK TRANSMISSION FOR SIDELINK COMMUNICATION WITH MULTI-TRP ENABLED UEs

CROSS-REFERENCE TO RELATED APPLICATIONS

This application is a national stage application under 35 U.S.C. 371 of PCT/CN2021/073188 filed Jan. 22, 2021, which is hereby expressly incorporated by reference herein in its entirety as if fully set forth below and for all applicable purposes.

FIELD OF THE DISCLOSURE

Aspects of the present disclosure relate to wireless communications, and more particularly, to device-to-device sidelink communication.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved device-to-device communications in a wireless network.

Certain aspects of this disclosure provide a method for wireless communications by a first user equipment (UE). The method generally includes receiving a first sidelink transmission from a second UE, determining resources for providing a feedback responsive to the first sidelink transmission, selecting one or multiple transmitter receiver points (TRPs), from a set of TRPs of the UE, for transmitting the feedback, based on one or more conditions, and transmitting the feedback on the determined resources using the selected TRPs.

Certain aspects of this disclosure provide a method for wireless communications by a second UE. The method generally includes transmitting a first sidelink transmission to at least one transmitter receiver point (TRP) of a first UE that has a set of TRPs, determining resources for receiving feedback from the first UE responsive to the first sidelink transmission, and receiving the feedback on the determined resources from at least one of the TRPs of the first UE selected for transmitting the feedback based on one or more conditions.

Certain aspects of this disclosure provide a first user equipment (UE). The first UE generally includes a receiver configured to receive a first sidelink transmission from a second UE; a processing system configured to determine resources for providing a feedback responsive to the first sidelink transmission and select one or multiple transmitter receiver points (TRPs), from a set of TRPs of the UE, for transmitting the feedback, based on one or more conditions; and a transmitter configured to transmit the feedback on the determined resources using the selected TRPs.

Certain aspects of this disclosure provide a second user equipment (UE). The second UE generally includes a transmitter configured to transmit a first sidelink transmission to at least one transmitter receiver point (TRP) of a first UE that has a set of TRPs; a processing system configure to determine resources for receiving feedback from the first UE responsive to the first sidelink transmission; and a receiver configured to receive the feedback on the determined resources from at least one of the TRPs of the first UE selected for transmitting the feedback based on one or more conditions.

Aspects of the present disclosure also provide various UEs, apparatuses, means, and computer readable mediums configured to perform operations of the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 10 illustrates example operations for wireless communications by a first UE, in accordance with certain aspects of the present disclosure.

FIG. 11 illustrates example operations for wireless communications by a second UE, in accordance with certain aspects of the present disclosure.

FIG. 12 illustrates an example collision between two UEs transmitting on a same subchannel in a slot that may be addressed, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
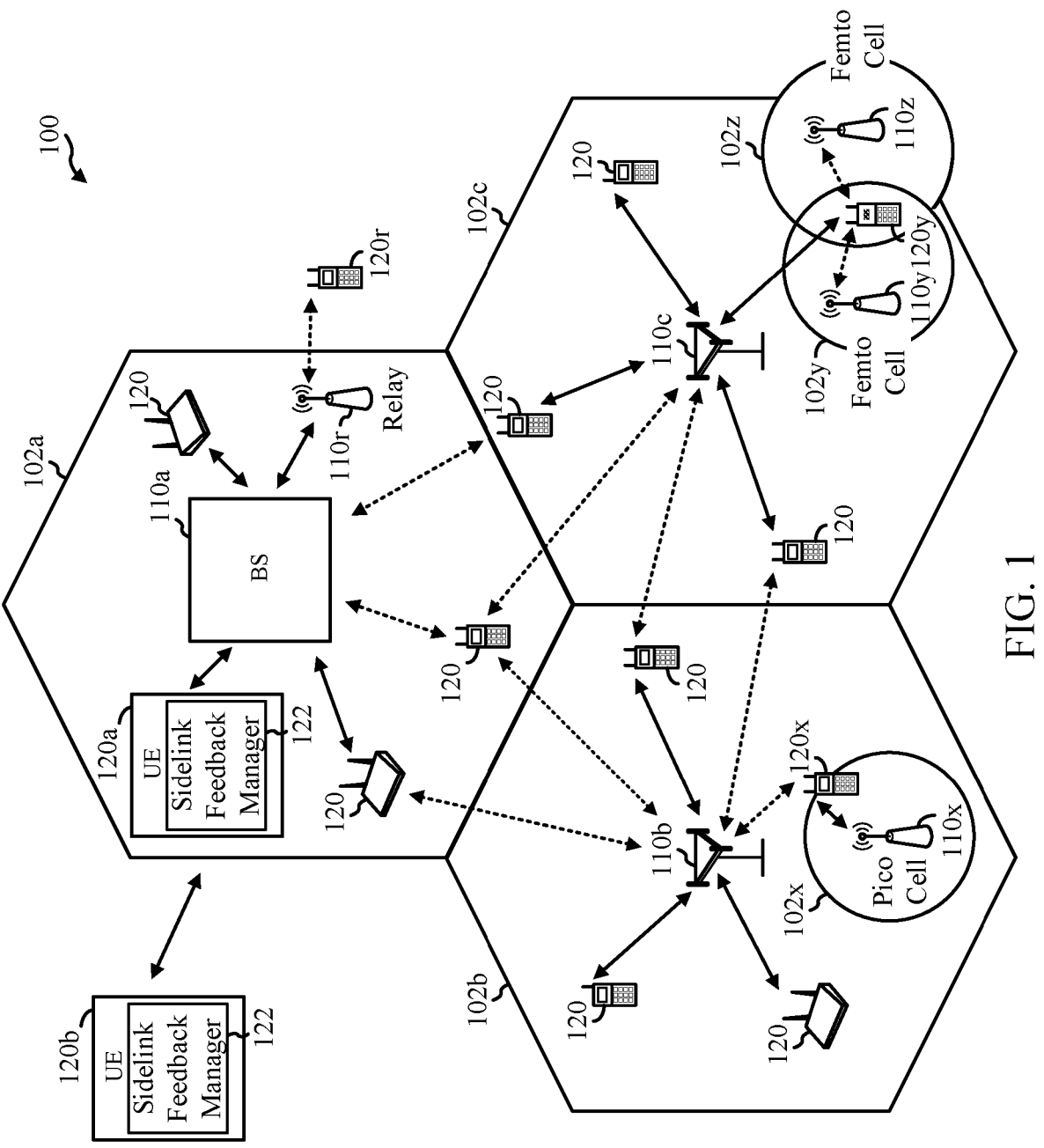
FIG. 1 is a block diagram conceptually illustrating an example telecommunications system, in accordance with certain aspects of the present disclosure.

Aspects of the present disclosure provide apparatus, methods, processing systems, and computer readable mediums for providing HARQ feedback for sidelink communications with multi-TRP (mTRP) enabled UEs.

As will be described in greater detail below, after receiving a sidelink transmission from another UE, an mTRP UE may determine resources for providing feedback for the sidelink transmission. The mTRP UE may also select one or more of its TRPs for transmitting feedback for the sidelink transmission, based on one or more conditions. The UE will then transmit the feedback on the determined resources using the selected TRPs. The conditions may be designed to select TRPs best suited for transmitting the feedback, which may increase the likelihood the UE that sent the sidelink transmission will successfully receive the feedback.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, one or more UEs 120 (e.g., UE 120a and/or UE 120b) of FIG. 1 may be mTRP UEs with a sidelink feedback manager 122 configured to perform operations described below with reference to FIG. 10 to determine resources and select TRPs to use to send feedback for sidelink transmissions. Similarly, one or more UEs could be configured to perform operations 1100 of FIG. 11 to process feedback for sidelink transmissions (e.g., received from an mTRP UE performing operations 1000 of FIG. 10).

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
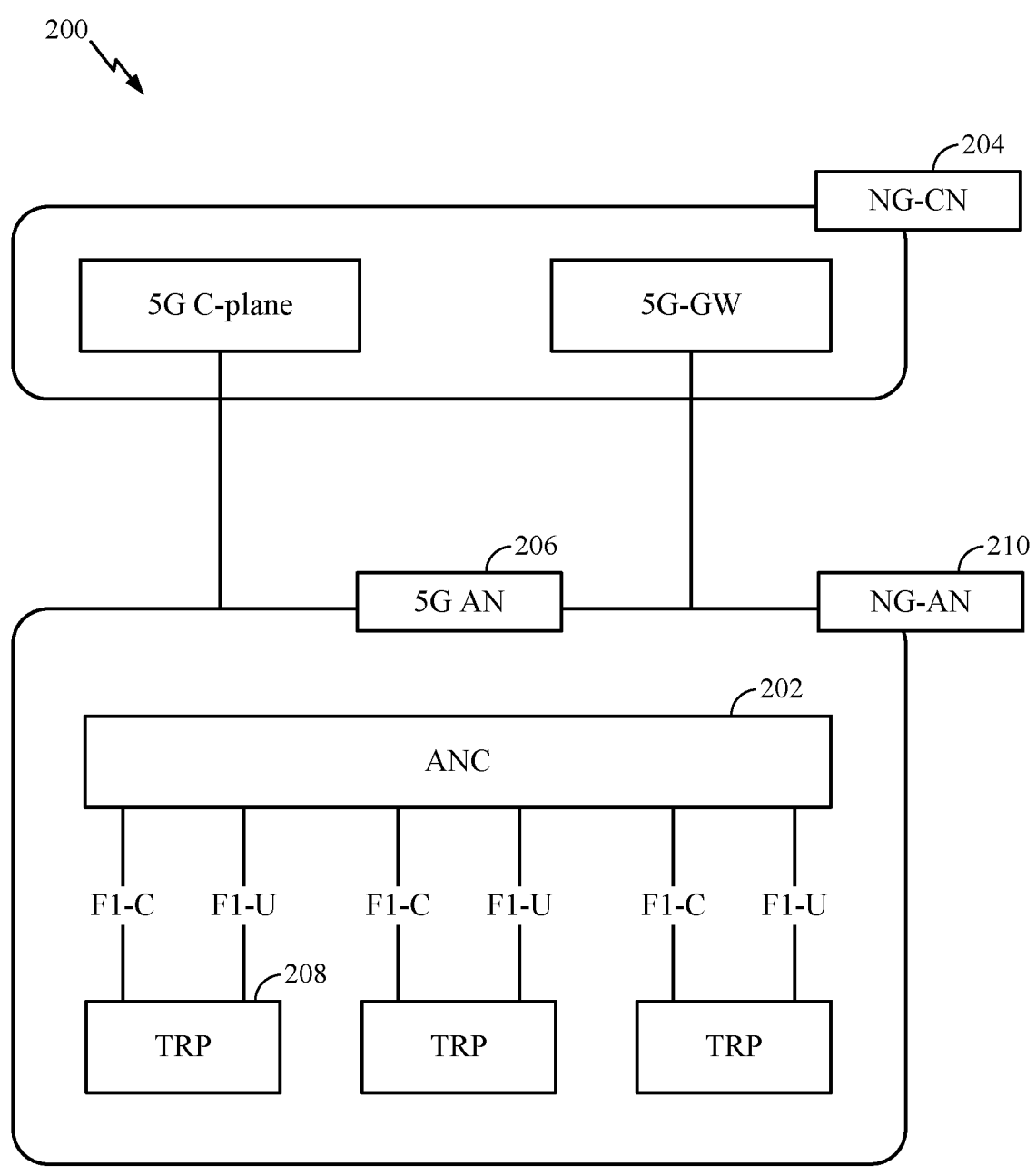
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
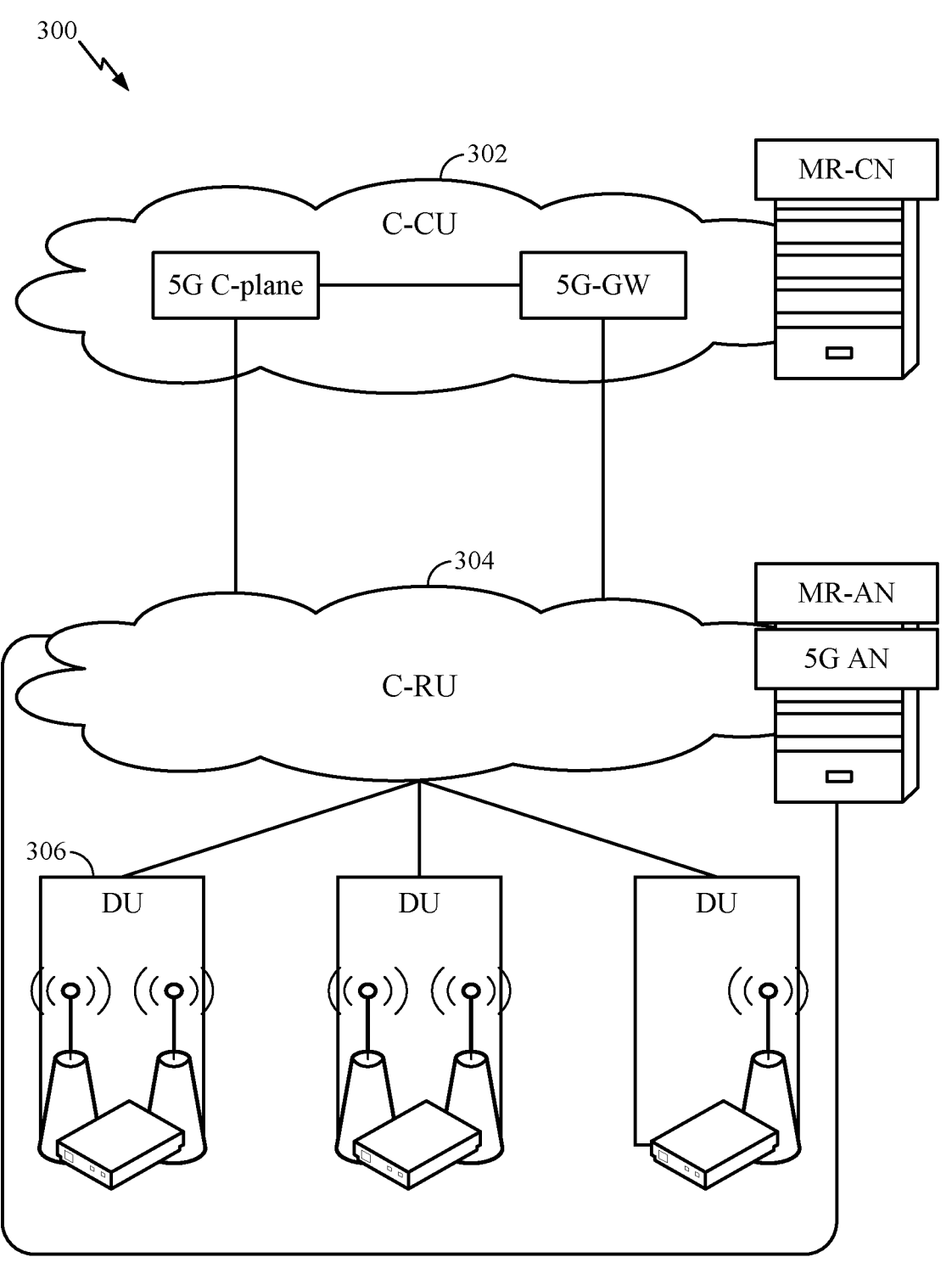
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
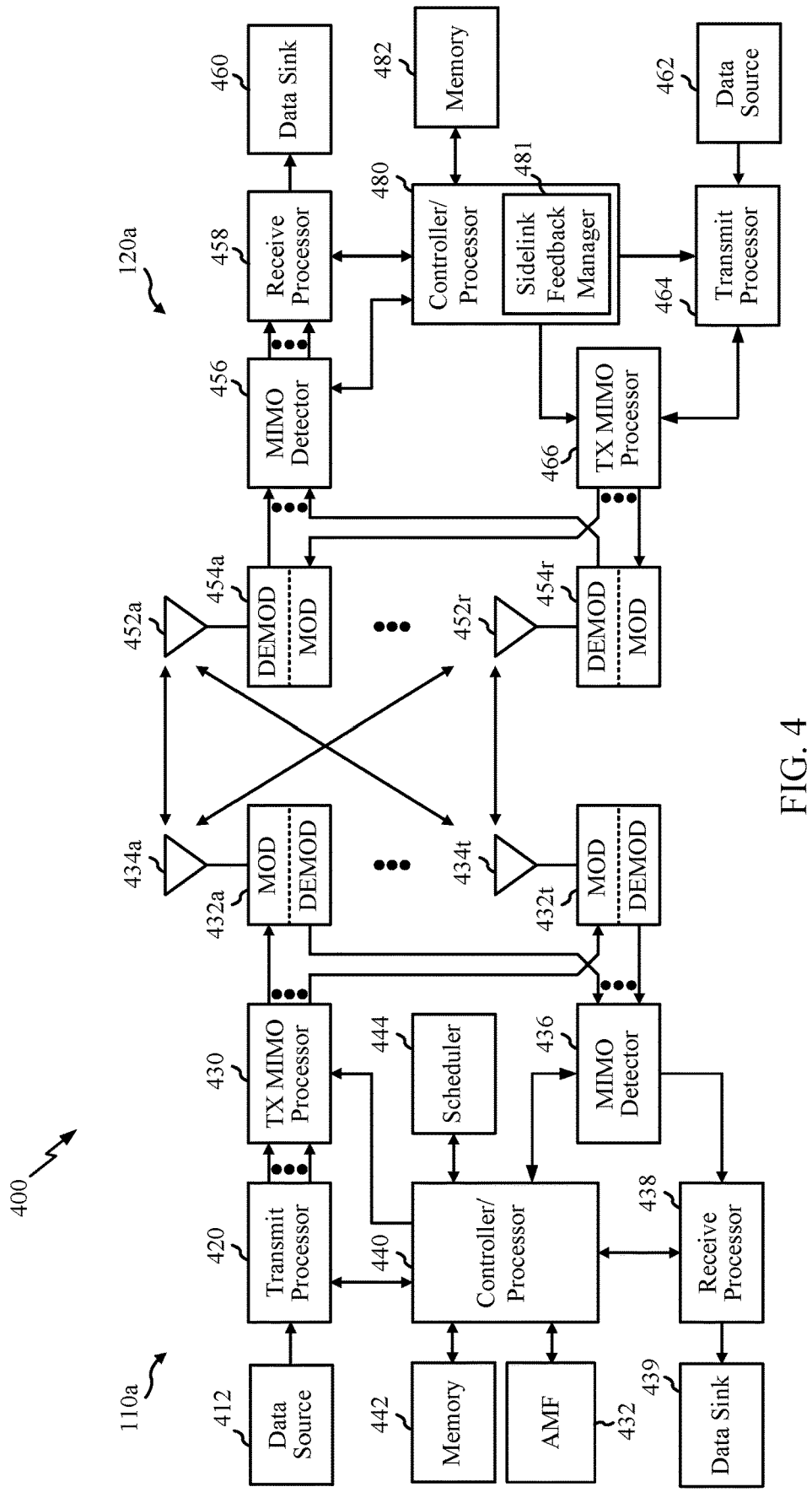
FIG. 4 is a block diagram conceptually illustrating a design of an example base station (B S) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a may be used to perform the various techniques and methods described herein with reference to FIG. 10.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. As shown in FIG. 4, the controller/processor 480 of the UE 120a has a sidelink feedback manager 481 that may be configured for perform operations 1000 of FIG. 10 and/or operations 1100 of FIG. 11.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figures 5A, 5B:
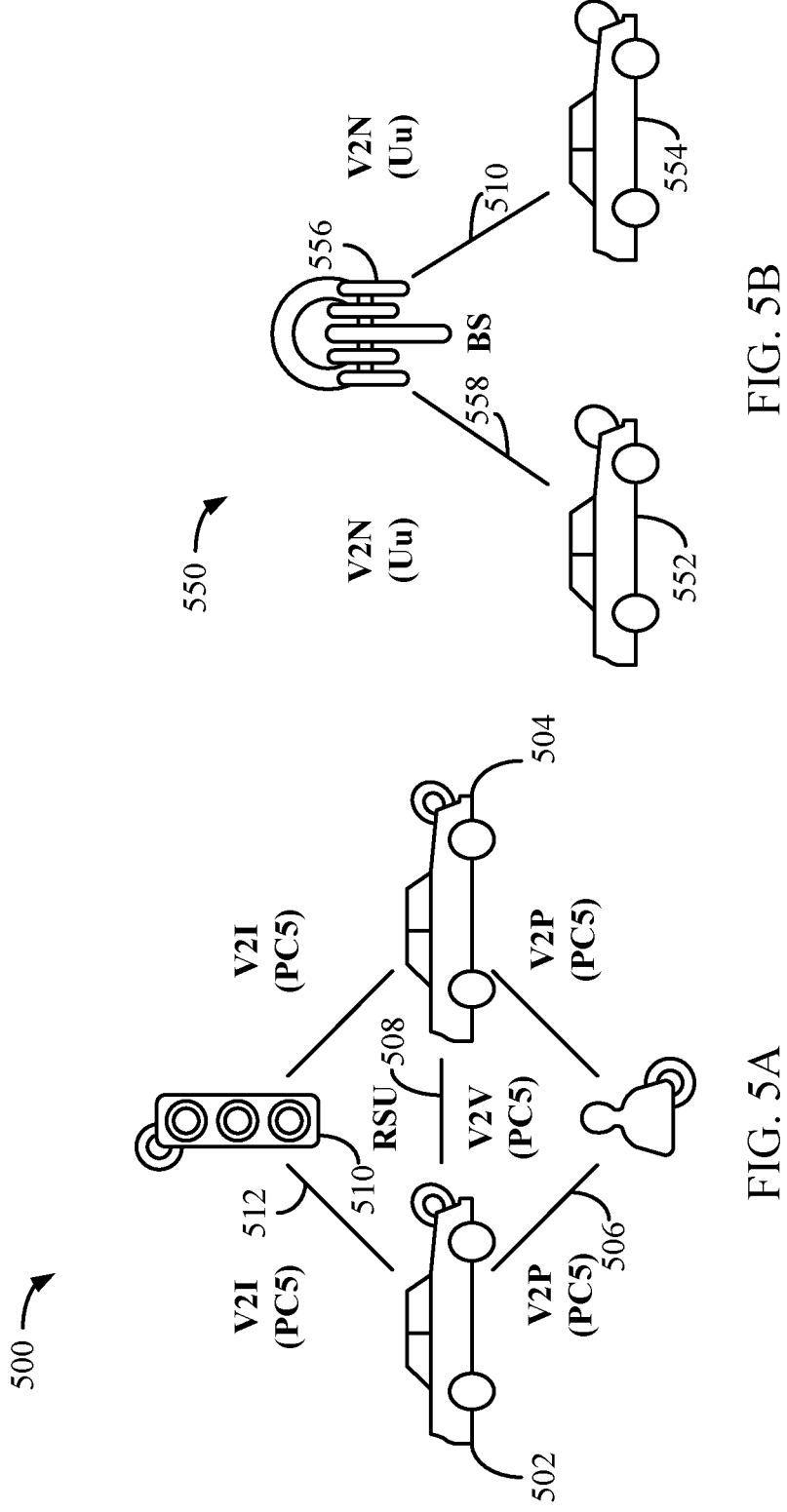
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
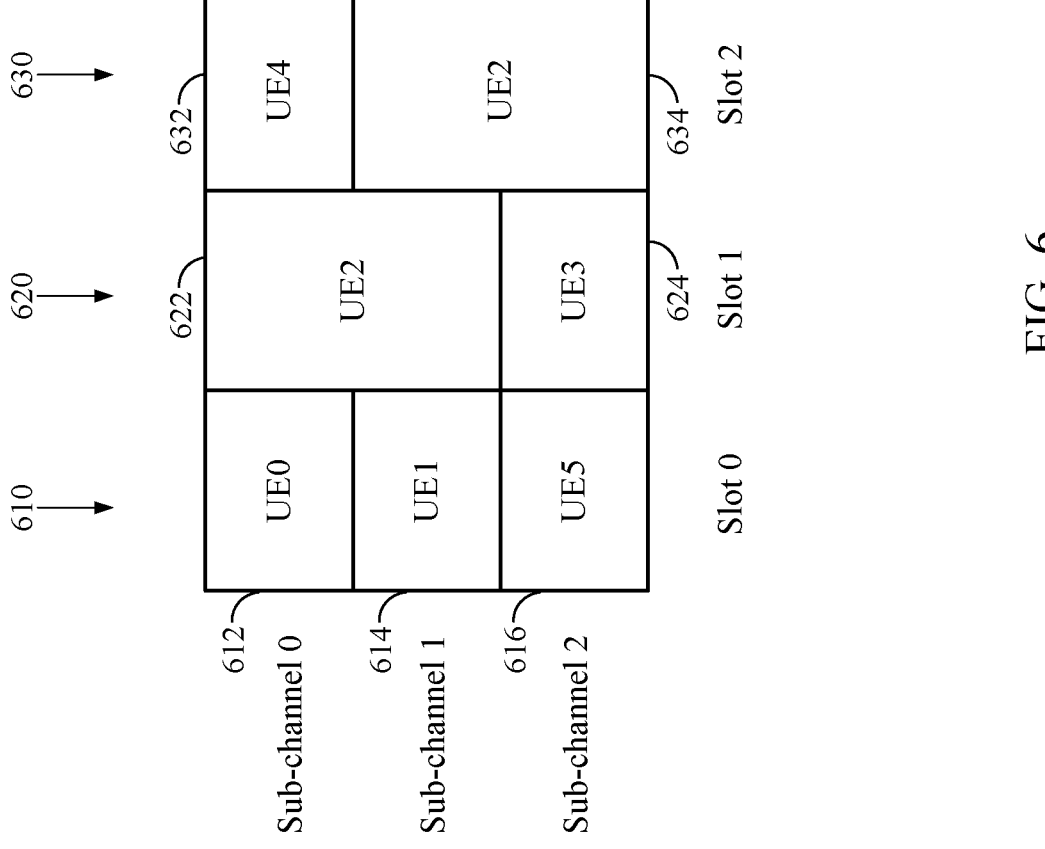
FIG. 6 illustrates an example allocation of a resource pool for sidelink communications, in accordance with certain aspects of the present disclosure.

FIG. 6 is an example of how resources of a common resource pool 600 may be allocated for sidelink communications (broadcast and groupcast device-to-device or D2D) between UEs (e.g., UEs 110, shown in FIG. 1). As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. Thus, UEs 0, 1, and 5, which transmit sidelink communications 612, 614, and 616 respectively, cannot receive the sidelink communications from each other. That is, UE 0 cannot receive the sidelink transmissions 614 and 616. Similarly, UE 2 cannot receive the sidelink transmissions 624 and 632 from UEs 3 and 4, respectively. Also, UE 3 cannot receive sidelink transmission 622 from UE 2, and UE 4 cannot receive the sidelink transmission 634 from UE 2.

Resource allocation may be reservation based in NR sidelink communications. In these techniques, resource allocations are made in units of sub-channels in the frequency domain and are limited to one slot in the time domain. In the previously known techniques, a transmission may reserve resources in the current slot and in up to two future slots. Reservation information may be carried in sidelink control information (SCI). In the previously known techniques, sidelink control information (SCI) may be transmitted in two stages. A first stage SCI (SCI-1) may be transmitted on a physical sidelink control channel (PSCCH) and contains resource reservation information as well as information needed to decode a second stage SCI (SCI-2). A SCI-2 may be transmitted on the physical sidelink shared channel (PSSCH) and contains information needed to decode data on the shared channel (SCH) and to provide feedback (e.g., acknowledgments (ACKs) or negative acknowledgments (NAKs)) over the physical sidelink feedback channel (PSFCH).

Example HARQ Feedback Transmission for Sidelink with mTRP Enabled UEs

Aspects of the present disclosure provide apparatus, methods, processing systems, and computer readable mediums for providing HARQ feedback for sidelink communications with multi-TRP (mTRP) enabled UEs. The techniques proposed herein may help an mTRP enabled UE select TRPs best suited for transmitting feedback for a sidelink transmission, which may increase the likelihood the UE that sent the sidelink transmission will successfully receive the feedback.

Some vehicles may have two or more transmitter-receiver points (TRP). For example, a car may have front and read antenna panels. Larger vehicles, like trucks and trailers, may have multiple TRPs. In such cases, the TRPs on the same vehicle may be separated by considerable distance (e.g., 3-4 m for a car or 20 m or more for an 18-wheeler truck and trailer).

Figure 7:
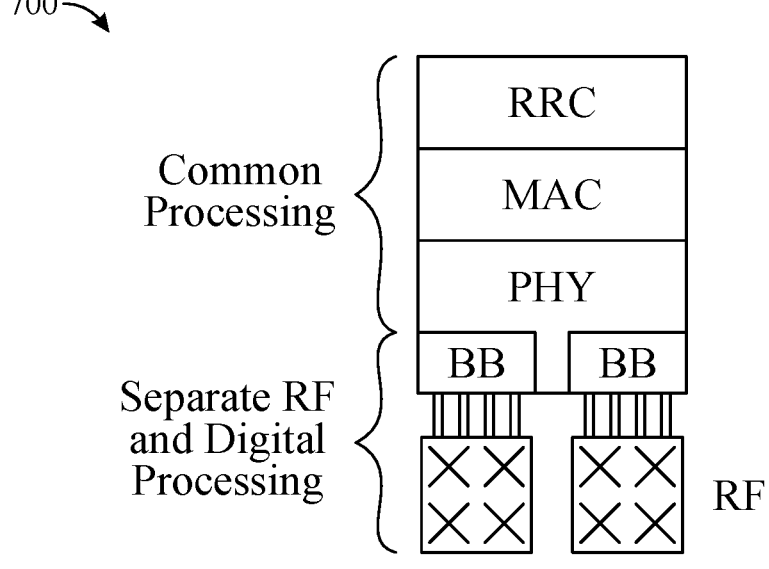
FIG. 7 illustrates an example hardware implementation for support of multi-TRP UEs.

As illustrated in FIG. 7, TRPs are generally implemented as different RF modules (with separate RF and digital processing) with some common processing, such as shared hardware and/or software controllers. As a result, each of the TRPs views the channel differently (different channel quality, RSRP, SNR, etc.), due to the difference of distance, line of sight (LOS) vs non-LOS (NLOS) channels, blocking, and the like.

Transmission may also be biased with mTRP UEs. For example, each TRP may have a different number of peers or different links to each of the peers. Further, traffic load may be higher for one TRP than another (e.g., communicating with more cars in front than behind) and one TRP may have poor link connections. Thus, it may be may be beneficial in these cases to vary transmission between TRPs. For example, it may be beneficial to transmit with more power, or a lower modulation and coding scheme (MCS), from one or more of the TRPs.

For NR V2X sidelink, if a first (UE1) transmits a data channel (e.g., PSSCH), a second UE (UE2) that has received the transmission may send acknowledgment feedback (ACK/NACK) on a physical sidelink feedback channel (PSFCH) to indicate whether the data successfully decoded. This HARQ feedback transmission (PSFCH) may happen on a (pre)configured PSFCH resource, which may occur periodically (e.g., in every N slots, where N=0, 1, 2, 4).

The PSFCH resource used for HARQ feedback transmission acknowledging a PSSCH may be determined based on the time and frequency location of the transmission (being acknowledged), transmitter UE ID (and receiver UE ID if HARQ feedback is for ACK/NACK based groupcast communication). Each HARQ feedback may be transmitted in one PRB and two OFDM symbols in the PSFCH resource There may be multiple PSFCH resources configured corresponding to a PSSCH transmission. Multiple PSFCH resources may be used for groupcast ACK/NACK feedback, so different Rx UEs in the group may transmit feedback in different PSFCH resource (so their feedback may be distinguished). It is possible that multiple Tx UEs transmit data in the same resource (resulting in a data collision). Providing multiple HARQ resources mapped from a same subchannel may alleviate such a HARQ collision (e.g., allowing feedback for the data transmissions from the multiple UEs to be distinguished).

Figure 8:
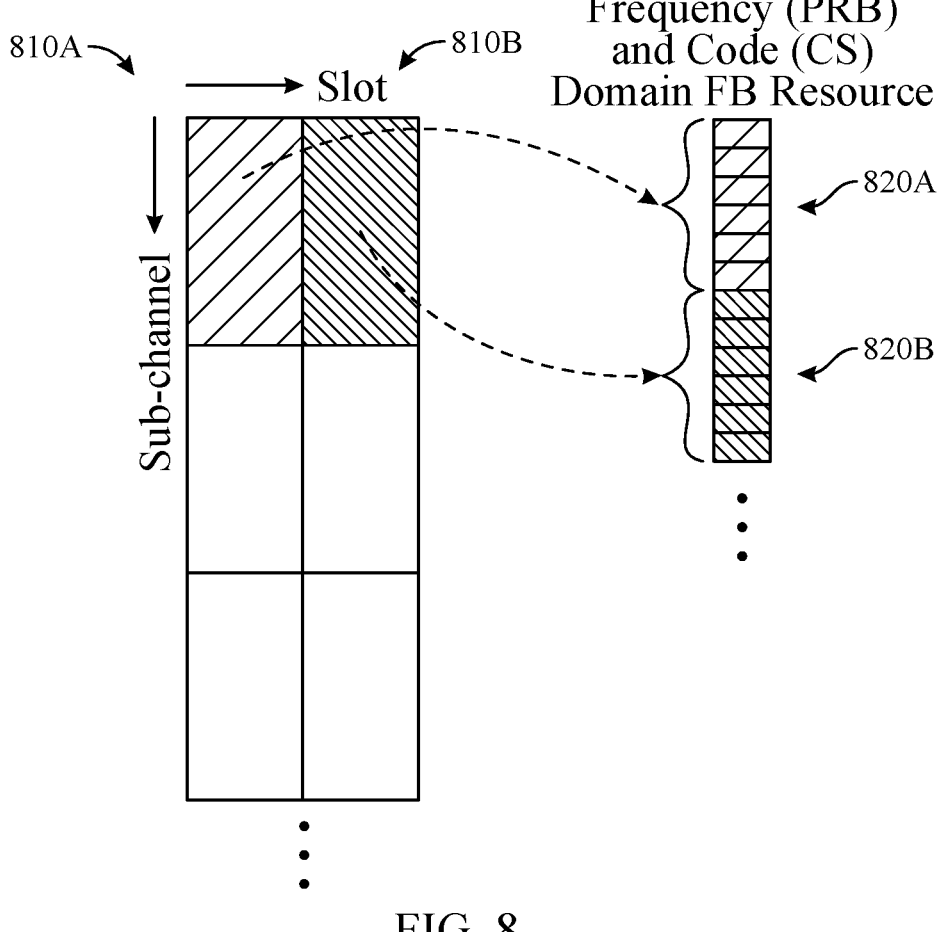
FIG. 8 illustrates example resources for sidelink communications, in accordance with certain aspects of the present disclosure.

FIG. 8 illustrates an example mapping of HARQ resources to resources used for sidelink data transmissions. As illustrated, a set of PRBs for HARQ feedback (PSFCH resources 820A and 820B) may be determined for each subchannel (based on subchannel time/frequency resource locations 810A and 810B). In such cases, a PRB and cyclic shift for a HARQ feedback transmission may be determined from the set of PRBs (e.g., based on Tx UE ID or Tx UE ID and Rx UE member ID).

There may be a number of challenges presented, however, when provide HARQ feedback by an mTRP UE. As noted above, Received signal power and/or quality can vary largely across TRPs.

Figure 9:
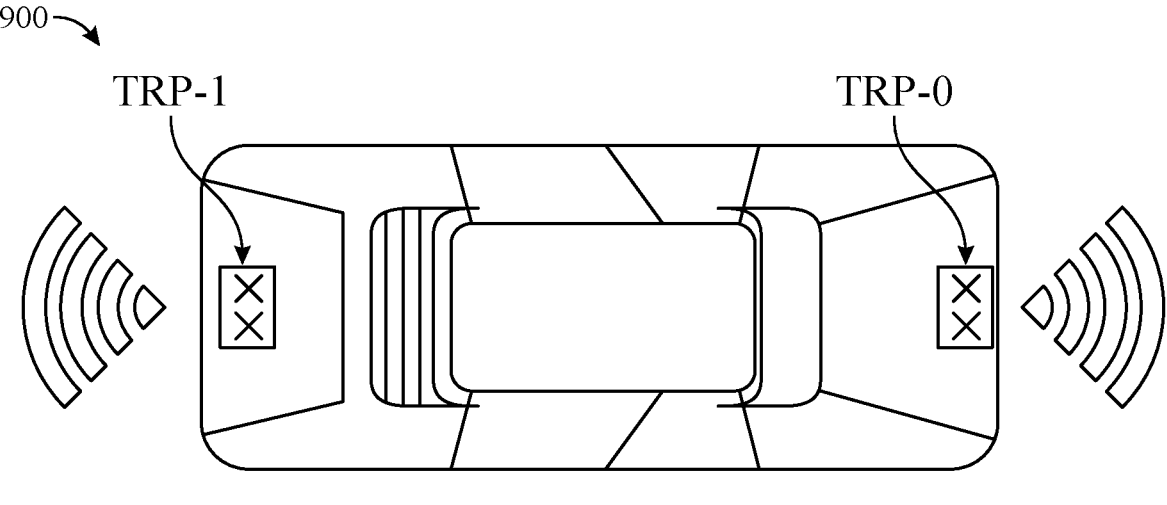
FIG. 9 illustrates an example scenario with a multiple transmitter receiver point (mTRP) enabled UE, in which aspects of the present disclosure may be utilized.

Referring to FIG. 9, for example, for a PSSCH transmission from a Tx UE, received signal power at TRP-0 of Rx UE may be much larger (or much less) than received signal power at TRP-1 of the Rx UE. In this example, it may not be desirable to transmit HARQ feedback for the PSSCH using TRP-1 (or TRP-0).

Another potential challenge is that multiple sidelink transmissions may be colliding. For example, in an autonomous resource allocation mode, two transmitting UEs (Tx UE1 and Tx UE2) may be transmitting PSSCH on the same (or overlapping) time/frequency resource. In this case, it may be possible that the Rx UE is able to decode both transmissions (e.g., if the received signal powers from the Tx UEs are varying across TRPs).

This may be understood by considering an example where, at TRP-0 of Rx UE, SNR of signals from Tx UE1 is much higher than SNR of signals from Tx UE2, while at TRP-1 of Rx UE, SNR of signals from Tx UE2 is much higher than SNR of signals from Tx UE1. The Rx UE may be able to decode transmission from Tx UE1 based on signal received at TRP-0, and decode transmission from Tx UE2 based on signal received at TRP-1.

In this case, according to aspects of the present disclosure, the TRP(s) used for HARQ feedback transmission may be selected based on the SNR or decoding TRP selection. As a result, it may be possible to transmit HARQ feedback to both Tx UEs (e.g., using different TRPs), even though the PSFCH transmission time/frequency resource may be colliding as well.

Aspects of the present disclosure provide mechanisms for providing HARQ feedback transmission with mTRP in such cases. The mechanisms allow an mTRP UE to determine one or more TRPs suitable to send HARQ feedback transmissions for a sidelink data channel transmission (PSCCH and/or PSSCH), in addition to determining time/frequency/code resources for such HARQ feedback transmission.

As will be described in greater detail below, the one or more TRPs for sending the HARQ feedback may be selected based on various factors (e.g., whether the sidelink data channel transmission is colliding/overlapping with another data channel transmission, the received signal strength/SNR/RSRP at the set of TRPs, and/or the determined time/frequency/code resource for the HARQ feedback transmission).

FIG. 10 illustrates example operations 1000 for wireless communications by a first UE, in accordance with certain aspects of the present disclosure. For example, operations 1000 may be performed by a receiving (Rx) mTRP UE 120 of FIG. 1 or FIG. 4 when providing HARQ feedback for sidelink communications with a second (transmitter) UE (that may or may not be mTRP enabled).

Operations 1000 begin, at 1002, by receiving a first sidelink transmission from a second UE. At 1004, the first UE determines resources for providing a feedback responsive to the first sidelink transmission. At 1006, the first UE select one or multiple transmitter receiver points (TRPs), from a set of TRPs of the UE, for transmitting the feedback, based on one or more conditions. At 1008, the first UE transmits the feedback on the determined resources using the selected TRPs.

FIG. 1100 illustrates example operations 1100 for wireless communications by a receiver UE and may be considered complementary to operations 1000 of FIG. 10. For example, operations 1100 may be performed by a (first Tx) UE 120 of FIG. 1 or FIG. 4 to receive and process HARQ feedback sent by a second (Rx) mTRP UE performing operations 1000 of FIG. 10.

Operations 1100 begin, at 1102, by transmitting a first sidelink transmission to at least one transmitter receiver point (TRP) of a first UE that has a set of TRPs. At 1104, the second UE determines resources for receiving feedback from the first UE responsive to the first sidelink transmission. At 1106, the second UE receives the feedback on the determined resources from at least one of the TRPs of the first UE selected for transmitting the feedback based on one or more conditions.

As noted above, in some cases, the techniques presented herein allow for the selection of TRPs for HARQ when multiple transmissions are colliding. For example, the techniques may allow for HARQ feedback in the case illustrated in FIG. 12, where 2 Tx UEs (TX UE1 and TX UE2) are transmitting PSSCHs on the same subchannel in a slot. In this case, the Rx UE may decode control signaling (e.g., PSCCH) of both transmissions. The Rx UE may select/determine a TRP (or multiple TRPs) for the HARQ feedback transmission if the multiple transmissions are colliding (e.g., if at least PSCCH transmissions are in the same subchannel).

Figure 13A:
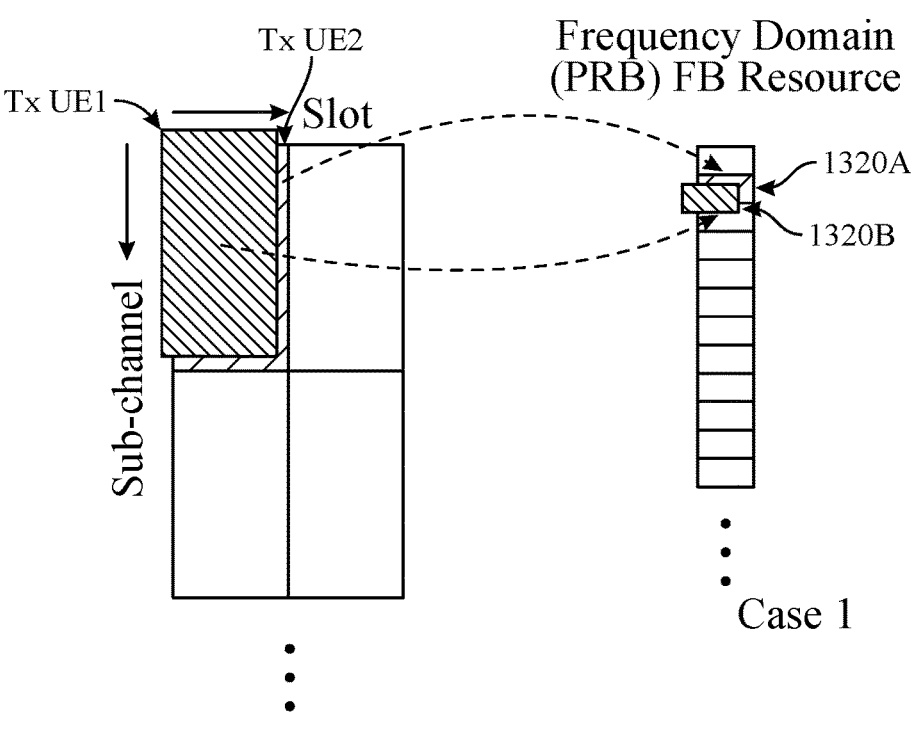
FIGS. 13A and 13B illustrate examples of HARQ feedback transmissions using one or more set of TRPs, in accordance with certain aspects of the present disclosure.

FIG. 13A illustrates a first case (Case 1) where an Rx UE transmits HARQ feedback using one or a subset of TRPs, if frequency resource(s) of the HARQ feedbacks are the same. As illustrated, it is possible that HARQ feedbacks for multiple data transmissions will be transmitted in the same HARQ feedback slot, in the same HARQ feedback frequency resource (e.g., in the same PRB). In this case, the Rx UE can use a different TRP to transmit HARQ feedback (PSFCH) to different Tx UEs, so the Rx UE is able to acknowledge colliding data transmissions. In some cases, the TRP determination can be based on the level or difference of received SNRs/RSRPs at each TRP.

In the example illustrated in FIG. 13A, the Rx UE decodes transmissions from Tx UE1 and Tx UE2 that are colliding (PSCCHs/PSSCHs on the same time/frequency resource). The Rx UE also determines HARQ feedback transmission resources for both transmissions, and the two PSFCHs (1320A and 1320B) happen to be in the same frequency resource (same PRB).

In conventional systems (e.g., following Rel-16 HARQ transmission rule), the Rx UE would only transmit one PSFCH (and would have to drop one of the PSFCHs). According to aspects of the present disclosure, however, the mTRP Rx UE may be capable of transmitting both, for example, transmitting the two PSFCHs using different TRPs.

In some cases, the TRP determination can be based on RSRP. This can be illustrated with an example assuming the measured RSRP from Tx UE n (n=1, 2) at TRP m (m=0, 1) of the Rx UE is denoted as $RSRP_{n,m}$. The Rx UE transmits HARQ feedback to Tx UE1 (on resource 1320B) using:

TRP 0, if $RSRP_{1,0} > RSRP_{1,1}$ (or, $RSRP_{1,0} \gg RSRP_{1,1}$, e.g., the difference between the RSRPs is larger than a threshold); or the Rx UE transmits HARQ feedback to Tx UE2 (on resource 1320A) using:

TRP 1, if $RSRP_{2,1} > RSRP_{2,0}$ (or, $RSRP_{2,1} \gg RSR_{P2,0}$, similarly).

In one example, the Rx UE may make the TRP selection decision if one of the (in)equations above holds. In another example, the Rx UE may make the TRP selection decision only if both of the (in)equations above hold. Besides RSRP, other metric(s) may also be possible, such as SNRs measured at each of the TRPs.

As an alternative (or in addition), the TRP selection for HARQ feedback transmission can be based on a decoding TRP determination. For example, the Rx UE may decode the Tx UE1 transmission based on signals received at TRP-0, then the HARQ feedback is sent (on resource 1320B) using TRP-0.

Figure 13B:
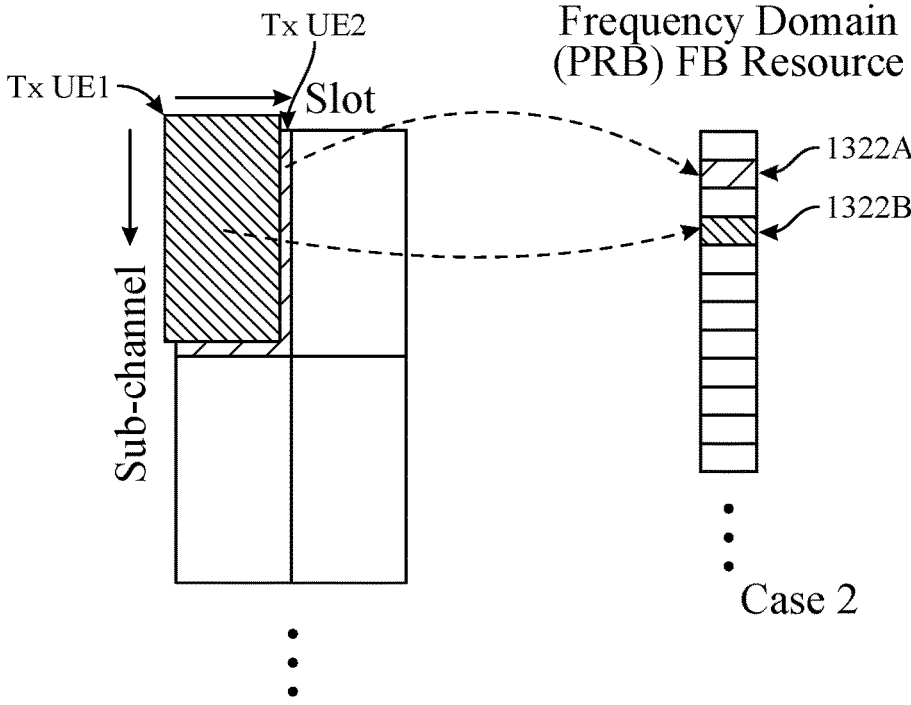

FIG. 13B illustrates a second case (Case 2), where an Rx UE transmits HARQ feedback (on separate HARQ resources 1322A and 1322B) using one or a subset of TRPs, if the UE detects that multiple sidelink transmissions are colliding.

As with the previous case (Case 1 of FIG. 13A), the Rx UE may do TRP selection for HARQ feedback transmission if the HARQ feedbacks are for colliding sidelink transmissions. In other words, the HARQ feedbacks for colliding data channel transmissions may be in the same frequency resource, or may be not and the Rx UE may select TRP for HARQ feedback transmission if colliding transmissions has been detected (as in the case illustrated in FIG. 13B). The TRP selection rule(s) can be the same as described above (for Case 1 illustrate in FIG. 13A).

Aspects of the present disclosure also provide mechanisms for a UE to select one or more TRP(s) for HARQ feedback transmission when received signal strengths (SNR, RSRP, etc.) at multiple TRPs are imbalanced. For example, TRP selection for HARQ feedback transmission may happen whether there is a data channel collision (as shown in FIGS. 13A and 13B) or not. There are various options for TRP selection. For example, according to a first option (Option 1), TRP selection may be based on the received signal strengths or qualities on the multiple TRPs. According to a second option (Option 2), power allocation for HARQ feedback transmission (using multiple TRPs) may be based on the received signal strengths or qualities on the multiple TRPs.

According to the first option, the Rx UE may select one or a subset of TRP(s) for a HARQ feedback transmission, based on the received signal quality of strengths (or difference of the received signal strengths) as observed at the different TRPs. The metric for received signal strength can be signal to noise ratio (SNR), signal to interference and noise ratio (SINR), reference signal received power (RSRP), reference signal received quality (RSRQ), and the like.

As an example, an Rx UE may receive a sidelink transmission from a Tx UE and determines that HARQ feedback for the sidelink transmission will be transmitted. In this example, the Rx UE may determine a HARQ feedback transmission resource (e.g., following Rel-16 rule or any other rule). The Rx UE may then determine one or more TRP(s) for the HARQ feedback transmission, based on the measured RSRP at the Rx UE's TRPs (assuming the Rx UE has two TRPs equipped).

This example can be illustrated, again assuming the measured RSRP from Tx UE n (n=1,2) at TRP m (m=0,1) of the Rx UE is denoted as $RSRP_{n,m}$. The Rx UE may select TRP(s) according to the following rules:

If $RSRP_0 \gg RSRP_1$ (e.g., $RSRP_0 - RSRP_1 > RSRP_{th} > 0$, where $RSRP_{th}$ is an RSRP threshold), the Rx UE transmits the HARQ feedback using TRP 0.

Otherwise:

If $RSRP_1 \gg RSRP_0$, the Rx UE transmits the HARQ feedback using TRP 1.

Otherwise, the Rx UE transmits the HARQ feedback using both TRPs.

As noted above, the Rx UE may use other metric(s) instead of RSRP (e.g., SNR measured at a TRP).

According to the second option (Option 2), the UE may determine physical sidelink feedback channel (PSFCH) transmission power for each of the TRPs (selected for HARQ feedback transmission). Determination of the power allocation can be based on the received signal quality or strengths (or difference of the received signal strengths). As with TRP selection described above, the metric for received signal quality/strength can be SNR, SINK, RSRP, and/or RSRQ.

The principle for transmission power allocation can generally be described as allocating larger power to a TRP for HARQ feedback transmission if that TRP observes larger received signal power/better signal quality in the receiving of the PSSCH transmission. This may be understood with reference to an example assuming an Rx UE receives a sidelink transmission from a Tx UE, and determines that HARQ feedback for the sidelink transmission will be transmitted. The Rx UE may first determine the HARQ feedback transmission resource (e.g., following Rel-16 rule or some other rule).

The Rx UE may then determine power for the HARQ feedback transmission for each TRP, based on the measured RSRP at the Rx UE's TRPs (assuming the Rx UE has two TRPs equipped). As noted above, the power allocation may be proportional to the measured RSRP (larger power if larger RSRP). For example, assuming an Rx UE with two TRPs equipped, the transmission power for the HARQ feedback at each TRP may be determined to satisfy:

$$\frac{p_0}{p_1} = \frac{RSRP_0}{RSRP_1},$$

where $p_0$ is transmission power for the HARQ feedback at TRP 0 and, $p_1$ is transmission power for the HARQ feedback at TRP 1.

Figure 14:
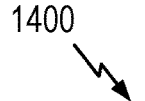
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 10. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 10, or other operations for performing the various techniques discussed herein. In certain aspects, computer-readable medium/memory 1412 stores code 1414 for obtaining a first sidelink transmission from a second UE; code 1416 for determining resources for providing a feedback responsive to the first sidelink transmission; code 1418 for selecting one or multiple transmitter receiver points (TRPs), from a set of TRPs of the UE, for outputting, for transmission, the feedback, based on one or more conditions; and code 1419 for transmitting the feedback on the determined resources using the selected TRPs. In certain aspects, the processor 1404 has circuitry configured to implement the code stored in the computer-readable medium/memory 1412. The processor 1404 includes circuitry 1424 for obtaining a first sidelink transmission from a second UE; circuitry 1426 for determining resources for providing a feedback responsive to the first sidelink transmission; circuitry 1428 for selecting one or multiple transmitter receiver points (TRPs), from a set of TRPs of the UE, for transmitting the feedback, based on one or more conditions; and circuitry 1429 for outputting, for transmission, the feedback on the determined resources using the selected TRPs.

Figure 15:
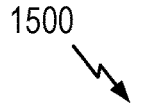
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 11. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 11, or other operations for performing the various techniques discussed herein. In certain aspects, computer-readable medium/memory 1512 stores code 1514 for outputting, for transmission, a first sidelink transmission to at least one transmitter receiver point (TRP) of a first UE that has a set of TRPs; code 1516 for determining resources for receiving feedback from the first UE responsive to the first sidelink transmission; and code 1518 for obtaining the feedback on the determined resources from at least one of the TRPs of the first UE selected for transmitting the feedback based on one or more conditions. In certain aspects, the processor 1504 has circuitry configured to implement the code stored in the computer-readable medium/memory 1512. The processor 1504 includes circuitry 1524 for outputting, for transmission, a first sidelink transmission to at least one transmitter receiver point (TRP) of a first UE that has a set of TRPs; circuitry 1526 for determining resources for receiving feedback from the first UE responsive to the first sidelink transmission; and circuitry 1528 for obtaining the feedback on the determined resources from at least one of the TRPs of the first UE selected for transmitting the feedback based on one or more conditions.

Example Aspects

Aspect 1: A method for wireless communications by a first user equipment (UE), comprising: receiving a first sidelink transmission from a second UE; determining resources for providing a feedback responsive to the first sidelink transmission; selecting one or multiple transmitter receiver points (TRPs), from a set of TRPs of the UE, for transmitting the feedback, based on one or more conditions; and transmitting the feedback on the determined resources using the selected TRPs.

Aspect 2: The method of Aspect 1, wherein the resources comprise at least two of time, frequency, and code resources for providing the feedback.

Aspect 3: The method of any one of Aspects 1-2, wherein the one or more conditions comprise at least one of: a condition that the first sidelink transmission overlaps with at least a second sidelink transmission; a condition based on a received signal metric at the set of TRPs for the first sidelink transmission; or a condition involving the determined resources for providing the feedback.

Aspect 4: The method of any one of Aspects 1-3, further comprising: receiving a second sidelink transmission from a third UE, wherein the one or more conditions comprise at least one condition that the first sidelink transmission overlaps with second sidelink transmission.

Aspect 5: The method of Aspect 4, further comprising determining other frequency resources for providing a second feedback responsive to the second sidelink transmission, wherein the frequency resources and the other frequency resources comprise at least some common frequency resources in a same feedback time slot.

Aspect 6: The method of Aspect 4, wherein the selection of the one or multiple TRPs comprises: selecting one or more first TRPs for transmitting the feedback responsive to the first sidelink transmission to the second UE; and selecting one or more second TRPs for transmitting a second feedback responsive to the second sidelink transmission to the third UE.

Aspect 7: The method of Aspect 6, wherein the first and second TRPs are selected based on received signal metrics at the set of TRPs for the first and second sidelink transmissions.

Aspect 8: The method of Aspect 7, wherein the one or more first TRPs are selected if at least one of: a first received signal metric for the first sidelink transmission, as measured at the one or more first TRPs, equals to or exceeds a second received signal metric for the first sidelink transmission, as measured at the one or more second TRPs; or the first received signal metric exceeds the second received signal metric by a threshold value.

Aspect 9: The method of Aspect 6, wherein: the selection of the one or more first TRPs comprises selecting the one or more first TRPs if the UE decodes the first sidelink transmission based on signals received at the one or more first TRPs; and the selection of the one or more second TRPs comprises selecting the one or more second TRPs if the UE decodes the second sidelink transmission based on signals received at the one or more second TRPs.

Aspect 10: The method of any one of Aspects 1-9, wherein the one or more conditions comprise a condition based on at least one received signal metric for the first sidelink transmission, as measured at the set of TRPs.

Aspect 11: The method of Aspect 10, wherein the selection one or multiple TRPs comprises: selecting a first TRP, a second TRP, or both the first and second TRPs for transmitting the feedback responsive to the first sidelink transmission based, at least in part, on the at least one received signal metric as measured at the first and second TRPs.

Aspect 12: The method of Aspect 11, wherein the first TRP is selected if at least one of: the received signal metric for first sidelink transmission, as measured at the first TRP, equals to or exceeds the received signal metric for the first sidelink transmission, as measured at the second TRP; or the received signal metric, as measured at the first TRP, exceeds the received signal metric, as measured at the second TRP, by a threshold value.

Aspect 13: The method of Aspect 11, wherein: the selection of the first TRP comprises selecting the first TRP if the received signal metric for the first sidelink transmission, as measured at the first TRP, exceeds the received signal metric for the first sidelink transmission, as measured at the second TRP, by a threshold value; and the selection of the second TRP comprises selecting the second TRP if the received signal metric for first sidelink transmission, as measured at the second TRP, exceeds the received signal metric for first sidelink transmission, as measured at the first TRP, by the threshold value.

Aspect 14: The method of any one of Aspects 11 and 13, wherein both the first TRP and the second TRP are selected if: the received signal metric for the first sidelink transmission, as measured at the first TRP, does not exceed the received signal metric for the first sidelink transmission, as measured at the second TRP, by the threshold value; and the received signal metric for the first sidelink transmission, as measured at the second TRP, does not exceed the received signal metric for first sidelink transmission, as measured at the first TRP, by the threshold value.

Aspect 15: The method of any of Aspects 11-14, further comprising allocating transmission power between the first and second TRPs based, at least in part, on the at least one received signal metric as measured at the first and second TRPs.

Aspect 16: The method of Aspect 15, wherein the allocation comprises: allocating more transmission power to the first TRP than the second TRP if the received signal metric for the first sidelink transmission, as measured at the first TRP, exceeds the received signal metric for the first sidelink transmission, as measured at the second TRP; or allocating more transmission power to the second TRP than the first TRP if the received signal metric for the first sidelink transmission, as measured at the second TRP, exceeds the received signal metric for the first sidelink transmission, as measured at the first TRP, by a threshold value.

Aspect 17: The method of Aspect 15, wherein the allocation comprises allocating the transmission power to the first and second TRPs proportionally to the received signal metrics, as measured at the first and second TRPs.

Aspect 18: A method for wireless communications by a second user equipment (UE), comprising: transmitting a first sidelink transmission to at least one transmitter receiver point (TRP) of a first UE that has a set of TRPs; determining resources for receiving feedback from the first UE responsive to the first sidelink transmission; and receiving the feedback on the determined resources from at least one of the TRPs of the first UE selected for transmitting the feedback based on one or more conditions.

Aspect 19: The method of Aspect 18, wherein the resources comprise at least two of time, frequency, and code resources for providing the feedback.

Aspect 20: The method of any one of Aspects 18-19, wherein the one or more conditions comprise at least one of: a condition that the first sidelink transmission overlaps with at least a second sidelink transmission; a condition based on a received signal metric at the set of TRPs for the first sidelink transmission; or a condition involving the determined resources for providing the feedback.

Aspect 21: The method of any one of Aspects 18-20, wherein the one or more conditions comprise a condition based on at least one received signal metric for the first sidelink transmission, as measured at the set of TRPs.

Aspect 22: A first user equipment (UE), comprising: a receiver configured to receive a first sidelink transmission from a second UE; a processing system configured to determine resources for providing a feedback responsive to the first sidelink transmission and select one or multiple transmitter receiver points (TRPs), from a set of TRPs of the UE, for transmitting the feedback, based on one or more conditions; and a transmitter configured to transmit the feedback on the determined resources using the selected TRPs.

Aspect 23: The first user of Aspect 22, wherein the resources comprise at least two of time, frequency, and code resources for providing the feedback.

Aspect 24: The first user of any one of Aspects 22-23, wherein the one or more conditions comprise at least one of: a condition that the first sidelink transmission overlaps with at least a second sidelink transmission; a condition based on a received signal metric at the set of TRPs for the first sidelink transmission; or a condition involving the determined resources for providing the feedback.

Aspect 25: The first user of any one of Aspects 22-24, wherein the receiver is further configured to receive a second sidelink transmission from a third UE, wherein the one or more conditions comprise at least one condition that the first sidelink transmission overlaps with second sidelink transmission.

Aspect 26: The first user of Aspect 25, wherein the processing system is further configured to determine other frequency resources for providing a second feedback responsive to the second sidelink transmission, wherein the frequency resources and the other frequency resources comprise at least some common frequency resources in a same feedback time slot.

Aspect 27: The first user of Aspect 25, wherein the selection of the one or multiple TRPs comprises: selecting one or more first TRPs for transmitting the feedback responsive to the first sidelink transmission to the second UE; and selecting one or more second TRPs for transmitting a second feedback responsive to the second sidelink transmission to the third UE.

Aspect 28: The first user of Aspect 27, wherein the first and second TRPs are selected based on received signal metrics at the set of TRPs for the first and second sidelink transmissions.

Aspect 29: The first user of Aspect 28, wherein the one or more first TRPs are selected if at least one of: a first received signal metric for the first sidelink transmission, as measured at the one or more first TRPs, equals to or exceeds a second received signal metric for the first sidelink transmission, as measured at the one or more second TRPs; or the first received signal metric exceeds the second received signal metric by a threshold value.

Aspect 30: The first user of Aspect 27, wherein: the selection of the one or more first TRPs comprises selecting the one or more first TRPs if the UE decodes the first sidelink transmission based on signals received at the one or more first TRPs; and the selection of the one or more second TRPs comprises selecting the one or more second TRPs if the UE decodes the second sidelink transmission based on signals received at the one or more second TRPs.

Aspect 31: The first user of any one of Aspects 22-30, wherein the one or more conditions comprise a condition based on at least one received signal metric for the first sidelink transmission, as measured at the set of TRPs.

Aspect 32: The first user of Aspect 31, wherein the selection one or multiple TRPs comprises: selecting a first TRP, a second TRP, or both the first and second TRPs for transmitting the feedback responsive to the first sidelink transmission based, at least in part, on the at least one received signal metric as measured at the first and second TRPs.

Aspect 33: The first user of Aspect 32, wherein the first TRP is selected if at least one of: the received signal metric for first sidelink transmission, as measured at the first TRP, equals to or exceeds the received signal metric for the first sidelink transmission, as measured at the second TRP; or the received signal metric, as measured at the first TRP, exceeds the received signal metric, as measured at the second TRP, by a threshold value.

Aspect 34: The first user of Aspect 32, wherein: the selection of the first TRP comprises selecting the first TRP if the received signal metric for the first sidelink transmission, as measured at the first TRP, exceeds the received signal metric for the first sidelink transmission, as measured at the second TRP, by a threshold value; and the selection of the second TRP comprises selecting the second TRP if the received signal metric for first sidelink transmission, as measured at the second TRP, exceeds the received signal metric for first sidelink transmission, as measured at the first TRP, by the threshold value.

Aspect 35: The first user of any one of Aspects 32 and 34, wherein both the first TRP and the second TRP are selected if: the received signal metric for the first sidelink transmission, as measured at the first TRP, does not exceed the received signal metric for the first sidelink transmission, as measured at the second TRP, by the threshold value; and the received signal metric for the first sidelink transmission, as measured at the second TRP, does not exceed the received signal metric for first sidelink transmission, as measured at the first TRP, by the threshold value.

Aspect 36: The first user of any one of Aspects 32-35, wherein the processing system is further configured to allocate transmission power between the first and second TRPs based, at least in part, on the at least one received signal metric as measured at the first and second TRPs.

Aspect 37: The first user of Aspect 36, wherein the allocation comprises: allocating more transmission power to the first TRP than the second TRP if the received signal metric for the first sidelink transmission, as measured at the first TRP, exceeds the received signal metric for the first sidelink transmission, as measured at the second TRP; or allocating more transmission power to the second TRP than the first TRP if the received signal metric for the first sidelink transmission, as measured at the second TRP, exceeds the received signal metric for the first sidelink transmission, as measured at the first TRP, by a threshold value.

Aspect 38: The first user of Aspect 36, wherein the allocation comprises allocating the transmission power to the first and second TRPs proportionally to the received signal metrics, as measured at the first and second TRPs.

Aspect 39: A second user equipment (UE), comprising: a transmitter configured to transmit a first sidelink transmission to at least one transmitter receiver point (TRP) of a first UE that has a set of TRPs; a processing system configure to determine resources for receiving feedback from the first UE responsive to the first sidelink transmission; and a receiver configured to receive the feedback on the determined resources from at least one of the TRPs of the first UE selected for transmitting the feedback based on one or more conditions.

Aspect 40: The second UE of Aspect 39, wherein the resources comprise at least two of time, frequency, and code resources for providing the feedback.

Aspect 41: The second UE of any one of Aspects 39-40, wherein the one or more conditions comprise at least one of: a condition that the first sidelink transmission overlaps with at least a second sidelink transmission; a condition based on a received signal metric at the set of TRPs for the first sidelink transmission; or a condition involving the determined resources for providing the feedback.

Aspect 42: The second UE of any one of Aspects 39-41, wherein the one or more conditions comprise a condition based on at least one received signal metric for the first sidelink transmission, as measured at the set of TRPs.

Aspect 43: A first user equipment (UE), comprising: means for receiving a first sidelink transmission from a second UE; means for determining resources for providing a feedback responsive to the first sidelink transmission; and means for selecting one or multiple transmitter receiver points (TRPs), from a set of TRPs of the UE, for transmitting the feedback, based on one or more conditions; and means for transmitting the feedback on the determined resources using the selected TRPs.

Aspect 44: The first user of Aspect 43, wherein the resources comprise at least two of time, frequency, and code resources for providing the feedback.

Aspect 45: The first user of any one of Aspects 43-44, wherein the one or more conditions comprise at least one of: a condition that the first sidelink transmission overlaps with at least a second sidelink transmission; a condition based on a received signal metric at the set of TRPs for the first sidelink transmission; or a condition involving the determined resources for providing the feedback.

Aspect 46: The first user of any one of Aspects 43-45, further comprising: means for receiving a second sidelink transmission from a third UE, wherein the one or more conditions comprise at least one condition that the first sidelink transmission overlaps with second sidelink transmission.

Aspect 47: The first user of Aspect 46, further comprising means for determining other frequency resources for providing a second feedback responsive to the second sidelink transmission, wherein the frequency resources and the other frequency resources comprise at least some common frequency resources in a same feedback time slot.

Aspect 48: The first user of Aspect 46, wherein the means for selecting the one or multiple TRPs comprises: means for selecting one or more first TRPs for transmitting the feedback responsive to the first sidelink transmission to the second UE; and means for selecting one or more second TRPs for transmitting a second feedback responsive to the second sidelink transmission to the third UE.

Aspect 49: The first user of Aspect 48, wherein the first and second TRPs are selected based on received signal metrics at the set of TRPs for the first and second sidelink transmissions.

Aspect 50: The first user of Aspect 49, wherein the one or more first TRPs are selected if at least one of: a first received signal metric for the first sidelink transmission, as measured at the one or more first TRPs, equals to or exceeds a second received signal metric for the first sidelink transmission, as measured at the one or more second TRPs; or the first received signal metric exceeds the second received signal metric by a threshold value.

Aspect 51: The first user of Aspect 48, wherein: the means for selecting the one or more first TRPs comprises means for selecting the one or more first TRPs if the UE decodes the first sidelink transmission based on signals received at the one or more first TRPs; and the means for selecting the one or more second TRPs comprises means for selecting the one or more second TRPs if the UE decodes the second sidelink transmission based on signals received at the one or more second TRPs.

Aspect 52: The first user of any one of Aspects 43-51, wherein the one or more conditions comprise a condition based on at least one received signal metric for the first sidelink transmission, as measured at the set of TRPs.

Aspect 53: The first user of Aspect 52, wherein the means for selecting one or multiple TRPs comprises: means for selecting a first TRP, a second TRP, or both the first and second TRPs for transmitting the feedback responsive to the first sidelink transmission based, at least in part, on the at least one received signal metric as measured at the first and second TRPs.

Aspect 54: The first user of Aspect 53, wherein the first TRP is selected if at least one of: the received signal metric for first sidelink transmission, as measured at the first TRP, equals to or exceeds the received signal metric for the first sidelink transmission, as measured at the second TRP; or the received signal metric, as measured at the first TRP, exceeds the received signal metric, as measured at the second TRP, by a threshold value.

Aspect 55: The first user of Aspect 53, wherein: the means for selecting the first TRP comprises means for selecting the first TRP if the received signal metric for the first sidelink transmission, as measured at the first TRP, exceeds the received signal metric for the first sidelink transmission, as measured at the second TRP, by a threshold value; and the means for selecting the second TRP comprises means for selecting the second TRP if the received signal metric for first sidelink transmission, as measured at the second TRP, exceeds the received signal metric for first sidelink transmission, as measured at the first TRP, by the threshold value.

Aspect 56: The first user of any one of Aspects 53 and 55, wherein both the first TRP and the second TRP are selected if: the received signal metric for the first sidelink transmission, as measured at the first TRP, does not exceed the received signal metric for the first sidelink transmission, as measured at the second TRP, by the threshold value; and the received signal metric for the first sidelink transmission, as measured at the second TRP, does not exceed the received signal metric for first sidelink transmission, as measured at the first TRP, by the threshold value.

Aspect 57: The first user of any one of Aspects 53-56, further comprising means for allocating transmission power between the first and second TRPs based, at least in part, on the at least one received signal metric as measured at the first and second TRPs.

Aspect 58: The first user of Aspect 57, wherein the allocation means comprises: means for allocating more transmission power to the first TRP than the second TRP if the received signal metric for the first sidelink transmission, as measured at the first TRP, exceeds the received signal metric for the first sidelink transmission, as measured at the second TRP; or means for allocating more transmission power to the second TRP than the first TRP if the received signal metric for the first sidelink transmission, as measured at the second TRP, exceeds the received signal metric for the first sidelink transmission, as measured at the first TRP, by a threshold value.

Aspect 59: The first user of Aspect 57, wherein the allocation means comprises means for allocating the transmission power to the first and second TRPs proportionally to the received signal metrics, as measured at the first and second TRPs.

Aspect 60: A second user equipment (UE), comprising: means for transmitting a first sidelink transmission to at least one transmitter receiver point (TRP) of a first UE that has a set of TRPs; means for determining resources for receiving feedback from the first UE responsive to the first sidelink transmission; and means for receiving the feedback on the determined resources from at least one of the TRPs of the first UE selected for transmitting the feedback based on one or more conditions.

Aspect 61: The second UE of Aspect 60, wherein the resources comprise at least two of time, frequency, and code resources for providing the feedback.

Aspect 62: The second UE of any one of Aspects 60-61, wherein the one or more conditions comprise at least one of: a condition that the first sidelink transmission overlaps with at least a second sidelink transmission; a condition based on a received signal metric at the set of TRPs for the first sidelink transmission; or a condition involving the determined resources for providing the feedback.

Aspect 63: The second UE of any one of Aspects 60-62, wherein the one or more conditions comprise a condition based on at least one received signal metric for the first sidelink transmission, as measured at the set of TRPs.

Aspect 64: An apparatus for wireless communications by a first user equipment (UE), comprising: an interface configured to obtain a first sidelink transmission from a second UE; and a processing system configured to determine resources for providing a feedback responsive to the first sidelink transmission and select one or multiple transmitter receiver points (TRPs), from a set of TRPs of the UE, for transmitting the feedback, based on one or more conditions, wherein the interface is further configured to output the feedback for transmission on the determined resources using the selected TRPs.

Aspect 65: An apparatus for wireless communications by a second user equipment (UE), comprising: an interface configured to output, for transmission, a first sidelink transmission to at least one transmitter receiver point (TRP) of a first UE that has a set of TRPs; and a processing system configured to determine resources for receiving feedback from the first UE responsive to the first sidelink transmission, wherein the interface is further configured to obtain the feedback on the determined resources from at least one of the TRPs of the first UE selected for transmitting the feedback based on one or more conditions.

Aspect 66: A computer-readable medium wireless communications by a first user equipment (UE), comprising codes executable to: obtain a first sidelink transmission from a second UE; determine resources for providing a feedback responsive to the first sidelink transmission; select one or multiple transmitter receiver points (TRPs), from a set of TRPs of the UE, for transmitting the feedback, based on one or more conditions; and output the feedback for transmission on the determined resources using the selected TRPs.

Aspect 67: A computer-readable medium wireless communications by a second user equipment (UE), comprising codes executable to: output, for transmission, a first sidelink transmission to at least one transmitter receiver point (TRP) of a first UE that has a set of TRPs; determine resources for receiving feedback from the first UE responsive to the first sidelink transmission; and obtain the feedback on the determined resources from at least one of the TRPs of the first UE selected for transmitting the feedback based on one or more conditions.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 10 and 11 may be performed by various processors shown in FIG. 4, such as processors 466, 458, 464, and/or controller/processor 480 of the UE 120*a*.

Furthermore, means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for determining, means for selecting, and means for allocating may include a processing system, which may include one or more processors, such as processors 466, 458, 464, and/or controller/processor 480 of the UE 120*a* and/or processors 420, 430, 438, and/or controller/processor 440 of the BS 110*a* shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first user equipment (UE), comprising:
   receiving a first sidelink transmission from a second UE;
   receiving a second sidelink transmission from a third UE;
   determining resources for providing a feedback responsive to the first sidelink transmission;
   selecting one or multiple transmitter receiver points (TRPs), from a set of TRPs of the first UE, for transmitting the feedback, based on one or more conditions, wherein the one or more conditions comprise at least one condition that the first sidelink transmission overlaps with the second sidelink transmission; and
   transmitting the feedback on the determined resources using the one or multiple TRPs.

2. The method of claim 1, wherein the resources comprise at least two of time, frequency, and code resources for providing the feedback.

3. The method of claim 1, wherein the one or more conditions further comprise at least one of:
   a condition based on a received signal metric at the set of TRPs for the first sidelink transmission; or
   a condition involving the determined resources for providing the feedback.

4. The method of claim 1, wherein the resources include frequency resources and the method further comprises determining other frequency resources for providing a second feedback responsive to the second sidelink transmission, wherein the frequency resources and the other frequency resources comprise at least one common frequency resource in a same feedback time slot.

5. The method of claim 1, wherein the selection of the one or multiple TRPs comprises:
   selecting one or more first TRPs for transmitting the feedback responsive to the first sidelink transmission to the second UE; and selecting one or more second TRPs for transmitting a second feedback responsive to the second sidelink transmission to the third UE.

6. The method of claim 5, wherein the first and second TRPs are selected based on received signal metrics at the set of TRPs for the first and second sidelink transmissions.

7. The method of claim 6, wherein the one or more first TRPs are selected if at least one of:

a first received signal metric for the first sidelink transmission, as measured at the one or more first TRPs, equals to or exceeds a second received signal metric for the first sidelink transmission, as measured at the one or more second TRPs; or the first received signal metric exceeds the second received signal metric by a threshold value.

8. The method of claim 5, wherein:

the selection of the one or more first TRPs comprises selecting the one or more first TRPs if the UE decodes the first sidelink transmission based on signals received at the one or more first TRPs; and the selection of the one or more second TRPs comprises selecting the one or more second TRPs if the UE decodes the second sidelink transmission based on signals received at the one or more second TRPs.

9. The method of claim 1, wherein the one or more conditions comprise a condition based on at least one received signal metric for the first sidelink transmission, as measured at the set of TRPs.

10. The method of claim 9, wherein the selection of one or multiple TRPs comprises:

selecting a first TRP, a second TRP, or both the first and second TRPs for transmitting the feedback responsive to the first sidelink transmission based, at least in part, on the at least one received signal metric as measured at the first and second TRPs.

11. The method of claim 10, wherein the first TRP is selected if at least one of:

the received signal metric for first sidelink transmission, as measured at the first TRP, equals to or exceeds the received signal metric for the first sidelink transmission, as measured at the second TRP; or the received signal metric, as measured at the first TRP, exceeds the received signal metric, as measured at the second TRP, by a threshold value.

12. The method of claim 10, wherein:

the selection of the first TRP comprises selecting the first TRP if the received signal metric for the first sidelink transmission, as measured at the first TRP, exceeds the received signal metric for the first sidelink transmission, as measured at the second TRP, by a threshold value; and the selection of the second TRP comprises selecting the second TRP if the received signal metric for first sidelink transmission, as measured at the second TRP, exceeds the received signal metric for first sidelink transmission, as measured at the first TRP, by the threshold value.

13. The method of claim 10, wherein both the first TRP and the second TRP are selected if:

the received signal metric for the first sidelink transmission, as measured at the first TRP, does not exceed the received signal metric for the first sidelink transmission, as measured at the second TRP, by a threshold value; and the received signal metric for the first sidelink transmission, as measured at the second TRP, does not exceed the received signal metric for first sidelink transmission, as measured at the first TRP, by the threshold value.

14. The method of claim 10, further comprising allocating transmission power between the first and second TRPs based, at least in part, on the at least one received signal metric as measured at the first and second TRPs.

15. The method of claim 14, wherein the allocation comprises:

allocating more transmission power to the first TRP than the second TRP if the received signal metric for the first sidelink transmission, as measured at the first TRP, exceeds the received signal metric for the first sidelink transmission, as measured at the second TRP; or allocating more transmission power to the second TRP than the first TRP if the received signal metric for the first sidelink transmission, as measured at the second TRP, exceeds the received signal metric for the first sidelink transmission, as measured at the first TRP, by a threshold value.

16. The method of claim 14, wherein the allocation comprises allocating the transmission power to the first and second TRPs proportionally to the received signal metrics, as measured at the first and second TRPs.

17. The method of claim 1, wherein the first sidelink transmission overlaps with the second sidelink transmission on a time and frequency resource.

18. A method for wireless communications by a second user equipment (UE), comprising:

transmitting a first sidelink transmission to at least one transmitter receiver point (TRP) of a first UE that has a set of TRPs;

determining resources for receiving feedback from the first UE responsive to the first sidelink transmission; and receiving the feedback on the determined resources from at least one of the TRPs of the first UE selected for transmitting the feedback based on one or more conditions, wherein the one or more conditions comprise at least one condition that the first sidelink transmission overlaps with a second sidelink transmission from a third UE.

19. The method of claim 18, wherein the resources comprise at least two of time, frequency, and code resources for providing the feedback.

20. The method of claim 18, wherein the one or more conditions comprise at least one of:

a condition based on a received signal metric at the set of TRPs for the first sidelink transmission; or a condition involving the determined resources for providing the feedback.

21. The method of claim 18, wherein the one or more conditions comprise a condition based on at least one received signal metric for the first sidelink transmission, as measured at the set of TRPs.

22. A first user equipment (UE), comprising:

a receiver configured to:

receive a first sidelink transmission from a second UE; and receive a second sidelink transmission from a third UE;

a processing system configured to:

determine resources for providing a feedback responsive to the first sidelink transmission; and select one or multiple transmitter receiver points (TRPs), from a set of TRPs of the first UE, for transmitting the feedback, based on one or more conditions, wherein the one or more conditions comprise at least one condition that the first sidelink transmission overlaps with the second sidelink transmission; and a transmitter configured to transmit the feedback on the determined resources using the one or multiple TRPs.

23. A second user equipment (UE), comprising:

a transmitter configured to transmit a first sidelink transmission to at least one transmitter receiver point (TRP) of a first UE that has a set of TRPs;

a processing system configured to determine resources for receiving feedback from the first UE responsive to the first sidelink transmission; and a receiver configured to receive the feedback on the determined resources from at least one of the TRPs of the first UE selected for transmitting the feedback based on one or more conditions, wherein the one or more conditions comprise at least one condition that the first sidelink transmission overlaps with a second sidelink transmission from a third UE.

* * * * *